United States Patent

[11] 3,560,763

| [72] | Inventors | Francis X. Downey<br>Annandale;<br>Alick H. Frank, Springfield, Va. |
|---|---|---|
| [21] | Appl. No. | 686,400 |
| [22] | Filed | Nov. 29, 1967 |
| [45] | Patented | Feb. 2, 1971 |
| [73] | Assignee | The United States of America as represented by the Secretary of the Navy |

[54] ZERO-CROSSING DETECTOR
1 Claim, 5 Drawing Figs.

[52] U.S. Cl. ................................................. 307/235,
307/232, 307/236, 307/237, 307/258, 307/261,
307/323; 328/150
[51] Int. Cl. ............................................... H03k 5/20
[50] Field of Search .................................... 307/232,
235, 236, 237, 258, 261, 268, 323, 257, 265;
328/109, 118, 150

[56] References Cited
UNITED STATES PATENTS
3,223,850 12/1965 Carrozza et al. ............... 307/237X
3,244,909 4/1966 Henderson .................. 307/265
3,474,258 10/1969 Nagy, Jr. .................. 307/257X OTHER REFERENCES
IBM Technical Disclosure Bulletin, Vol. 6 No. 7, written by R. J. Lasker & L. E. Peterson, titled AC CROSS-OVER DETECTION, dated December 1963, p. 36. A copy is located in 307/235 in Art Unit 254.

*Primary Examiner*—Stanley T. Krawczewicz
*Attorneys*—R. S. Sciascia and A. L. Branning ABSTRACT: A zero-crossing detector which has a large dynamic range and includes a tunnel diode. The input signal is first clipped in both positive and negative amplitudes, and then the clipped signal is amplified and applied to a variably biased tunnel diode which produces a sharp voltage step at the zero-crossing point. By using a paraphase amplifier in front of the tunnel diode it is possible to choose either positive going or negative going crossing points.

The invention described herein may be manufactured and used by or for the Government of the United States of America for governmental purposes without the payment of any royalties thereon or therefor.

INVENTORS
FRANCIS X. DOWNEY
ALICK H. FRANK

INVENTORS
**FRANCIS X. DOWNEY
ALICK H. FRANK**

ZERO-CROSSING DETECTOR

BACKGROUND OF THE INVENTION

The present invention relates to zero-crossing detectors and more particular to such detectors including tunnel diodes.

A zero-crossing detector or trigger is a circuit which senses the moment an input signal crosses over the zero voltage line. Such a detector may be used to recover phase information from a sine wave data carrier by precisely detecting the times at which these signals cross the zero voltage line.

SUMMARY OF THE INVENTION

The presently disclosed zero-crossing detector is capable of accepting signals of any waveshape and producing zero-crossing signals with no significant phase shift over a wide dynamic range. The input signals are first double limited at levels slightly above and below the zero voltage line to eliminate any complex voltage variation which may occur above and below the zero line. The clipped signal is then amplified before it si applied to the tunnel diode circuit, so that the tunnel diode may be variably biased over a reasonably wide range to produce an abrupt output signal at the precise point desired. In order to be able to select negative-going or positive-going crossing points in the input signal, the clipped signal is amplified by an a paraphase amplifier, and a single-pole double-throw switch is used to select either an in-phase or out-of-phase signal for application to the tunnel diode circuit.

An object of the present invention is the provision of a tunnel diode zero-crossing detector which has a great dynamic range.

Another object is to provide a zero-crossing detector having practically no phase shift over its wide dynamic range.

A further object is a zero-crossing detector which can accept signals of any waveshape and produce output signals when the signals crosses the zero voltage from a selected direction.

Still another object is to provide a zero-crossing detector which can selectively indicate a positive-going crossing point or a negative-going crossing point.

Yet another object of the present invention is the provision of a tunnel diode zero-crossing detector which first clips the input signal to remove high voltage variations in the waveform and then amplifies the remaining clipped signal before applying it to the tunnel diode circuit.

A still further object is a tunnel diode zero-crossing detector in which the bias on the tunnel diode may be varied over a wide range to precisely choose the zero-crossing reference point on the input wave.

DESCRIPTION OF THE PREFERRED EMBODIMENT

Figure 1:
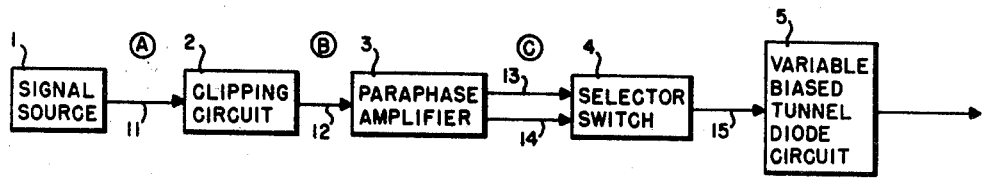
FIG. 1 shows a block diagram of an embodiment of the invention.
Figure 2A:
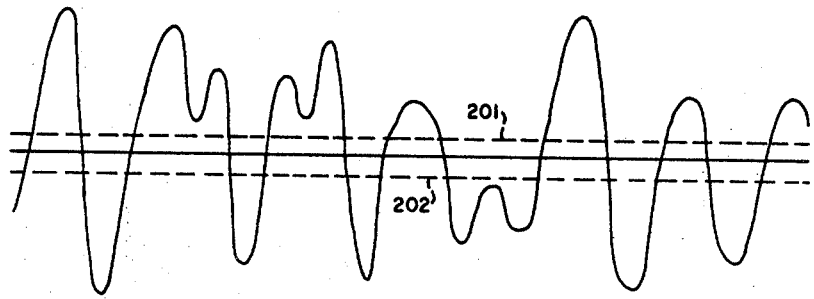
FIGS. 2A, 2B, and 2C show exemplary waveforms present in the system of FIG. 1.
Figure 2B:
Figure 2C:
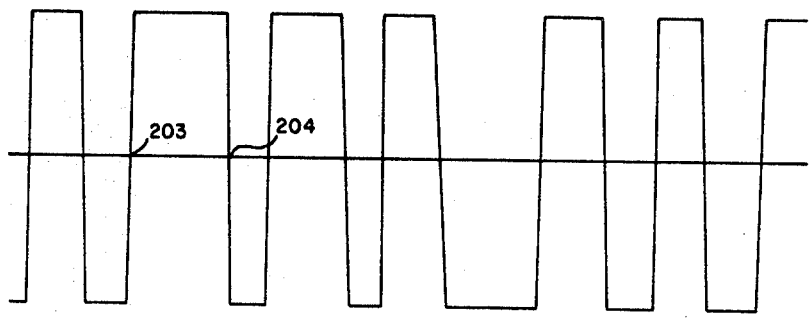

FIG. 1 is a simplified block diagram of an embodiment of the invention. The signal to be processed originates in signal source 1, and the waveforms shown in FIG. 2A, FIG. 2B and FIG. 2C appear at points A, B, and C, respectively, in FIG. 1. The input signal A is clipped by clipping circuit 2 at levels 201 and 202 shown in FIG. 2A. This clipping process will eliminate fluctuations occurring out of the range of interest and retain only signals near the crossing points being detected. The clipped signal shown in FIG. 2B appears at point B in FIG. 1 before being amplified in amplifier 3. The peak-to-peak value of the amplified signal shown in FIG. 2C is chosen so that the bias on the tunnel diode may be conveniently adjusted so that the tunnel diode will trigger at a selected point between the peak values. Amplifier 3 may be paraphase amplifier so that the signal of FIG. 2C will appear on line 13 while an inverted signal appears on line 14. Selector switch 4 may be a single-pole double-throw switch so that either the in-phase signal or the inverted phase signal may be applied via line 15 to tunnel diode circuit 5.

The tunnel diode may be biased so that it switches from a low-voltage state to high-voltage state when the input signal passes through a selected level. The tunnel diode may detect either positive-going crossings such as point 203 in FIG. 2C or negative-going crossing such as point 204 depending upon whether the in-phase or out-of-phase signal is applied to the tunnel diode circuit.

Figure 3:
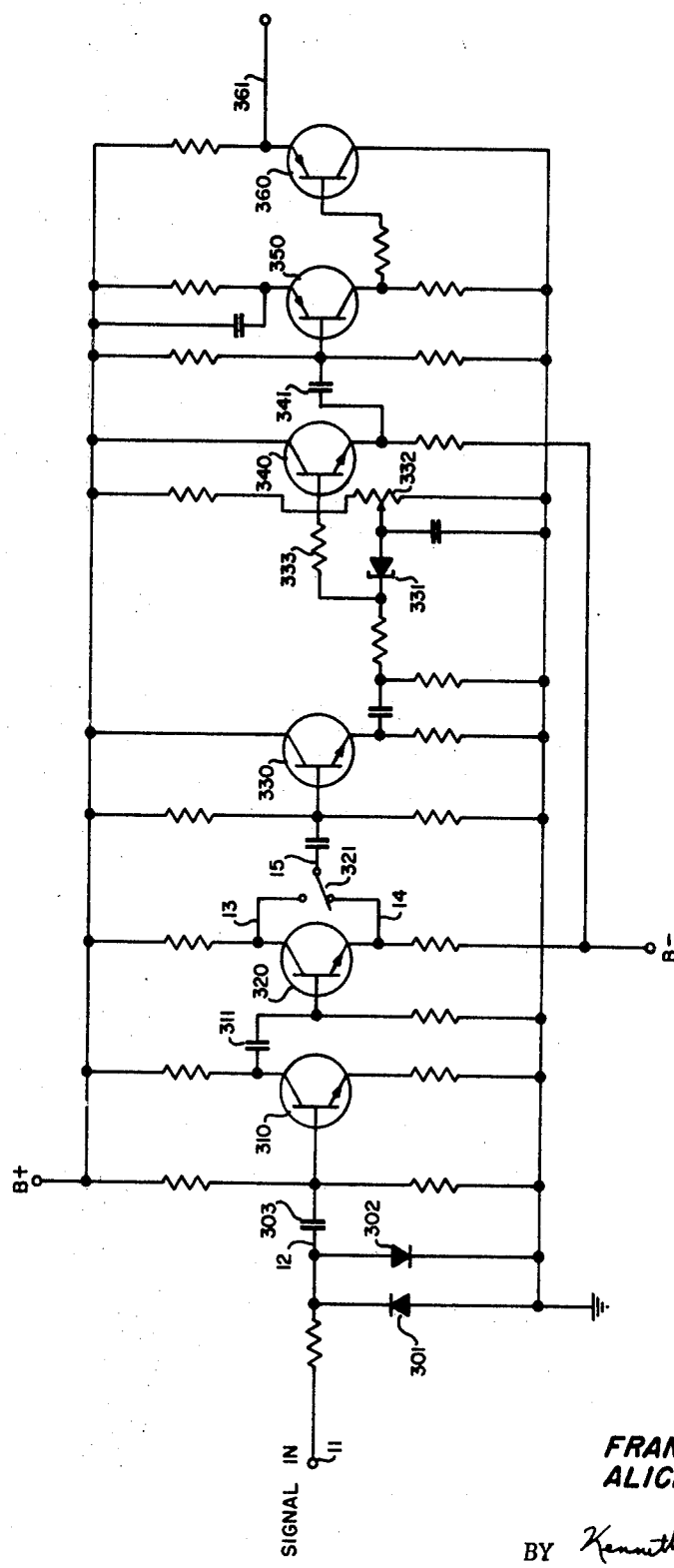
FIG. 3 shows a schematic diagram of a preferred embodiment of the invention.

FIG. 3 shows a detailed drawing of the embodiment of the invention shown in block form in FIG. 1. The input signal such as that shown in FIG. 2A is applied at point 11 and is double limited by diodes 301 and 302 which limit the positive and negative values of the signal so that the signal on line 12 is as shown in FIG. 2B. In the specific embodiment shown in the input signal at point 11 may cover a dynamic range from 300 mv to 30 volts peak-to-peak with less than ½ percent phase shift in the signal output. The pair of diodes 301, 302 limits the signal to ± 300 millivolts and this limited signal is capacity coupled through capacitor 303 to the base of transistor 310 which may be an amplifier having a gain of 10. The output of this amplifier is coupled through capacitor 311 to a paraphase amplifier comprising transistor 320.

Both the in-phase and inverted phase signals are coupled to an emitter follower 330 through a single-pole double-throw switch 321. This switch makes it possible to choose either signal for further processing. The signal on line 13 is in-phase with the input signal, while the signal on line 14 is out-of-phase with this signal. Emitter follower 330 drives the trigger circuit made up of tunnel diode 331 and transistor 340. The tunnel diode is biased through potentiometer 332 which can be adjusted so that the tunnel diode will switch from its low-voltage state to its high-voltage state when the input signal passes through a predetermined level. This sudden change in the voltage across tunnel diode 331 is applied through resistor 333 to the base of transistor 340. The output of transistor 340 is capacity coupled through capacitor 341 to limiter amplifier 350. The output of this limiter amplifier is directly coupled to the base of emitter follower 360. The final output on line 361 is a clamped square wave whose leading edge is synchronized to the positive or negative going zero-crossings of the input signal.

In conclusion therefore, there has been disclosed a tunnel diode zero-crossing detector which has a great dynamic range with practically no phase shift over the entire range.

Obviously many modificatons and variations of the present invention are possible in the light of the above teachings. It is therefore to be understood that within the scope of the appended claims the invention may be practiced otherwise than as specifically described.

We claim:

1. Apparatus for detecting an input signal comprising:
   a clipping circuit comprising a pair of oppositely poled diodes for clipping the amplitude of said input signal;
   a paraphase amplifier circuit consisting of a transistor connected to said clipping circuit for amplifying said clipped signal, said amplifier passing both an amplified signal and an amplified inverted signal;
   an amplifier connected between said paraphase amplifier circuit and said clipping circuit;
   selection means connected to said amplifier circuit for applying either of said signals to a tunnel diode;
   a tunnel diode connected to said selection means for receiving either of said signals and producing an abrupt output signal for a selected signal; and
   a potentiometer to bias said tunnel diode over a variable range whereby said diode may operate at any point on its volt-ampere characteristic.